Figure 3:
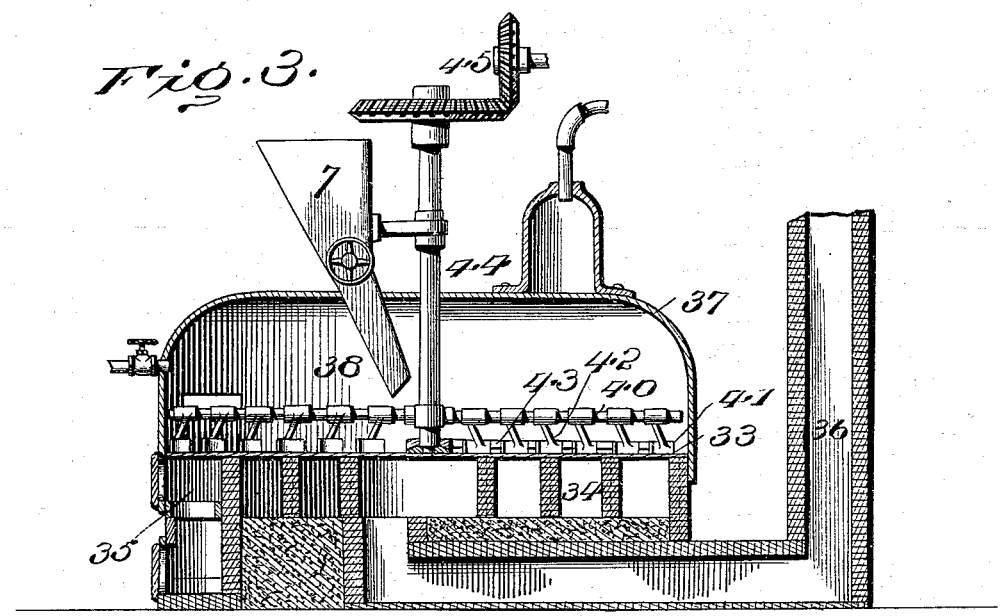

No. 648,389. Patented May 1, 1900.
H. O. CHUTE.
PROCESS OF MAKING ACETONE.
(Application filed June 10, 1899.)
(No Model.) 3 Sheets—Sheet 1.
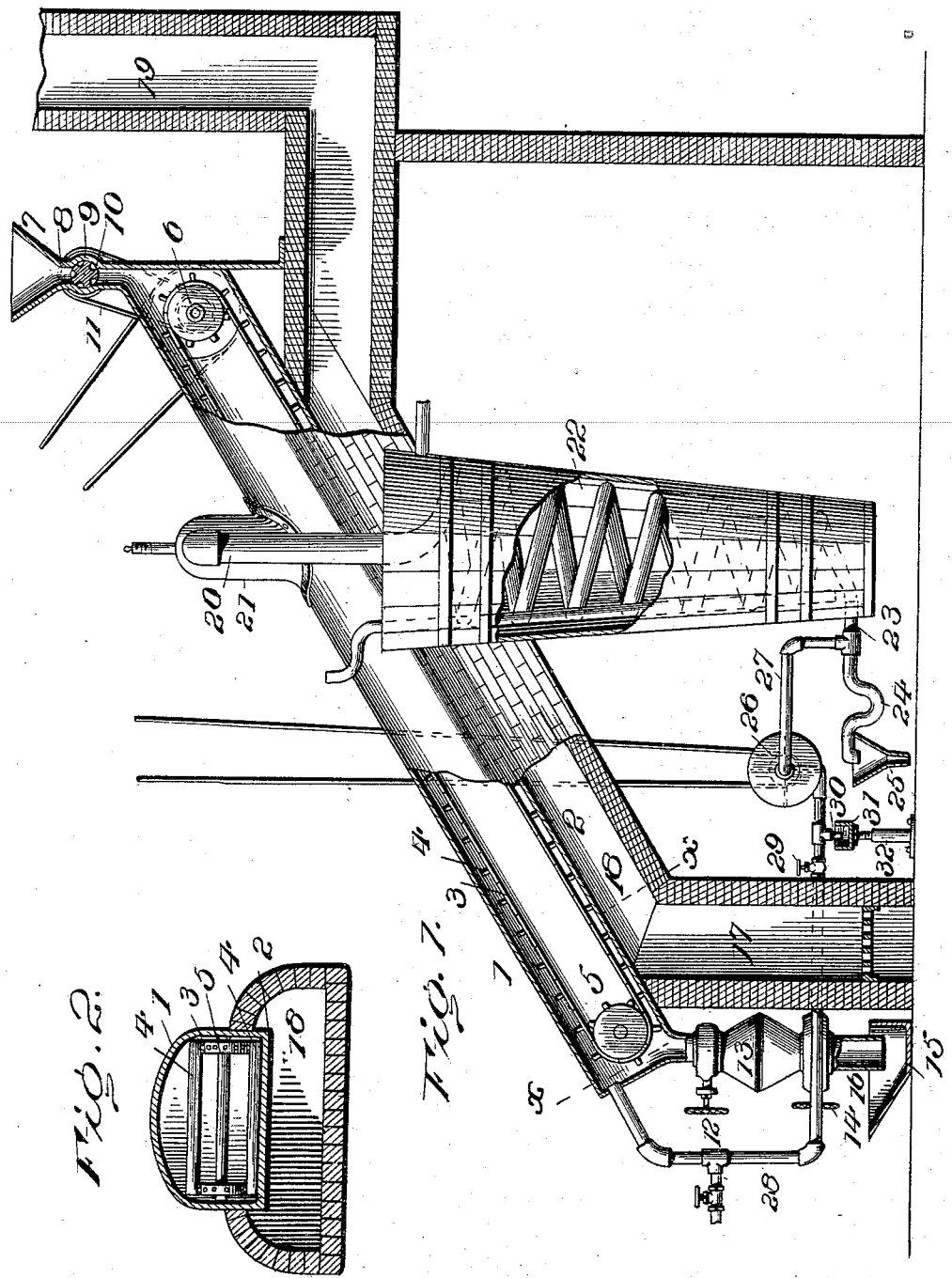
Witnesses
Jno Minnie
Gladys L. Thompson.
Inventor
Harry O. Chute
by R.S.&A.B.Lacey his Attorneys No. 648,389. Patented May 1, 1900.
H. O. CHUTE.
PROCESS OF MAKING ACETONE.
(Application filed June 10, 1899.)
(No Model.) 3 Sheets—Sheet 2.

No. 648,389. Patented May 1, 1900.
H. O. CHUTE.
PROCESS OF MAKING ACETONE.
(Application filed June 10, 1899.)
(No Model.) 3 Sheets—Sheet 3.
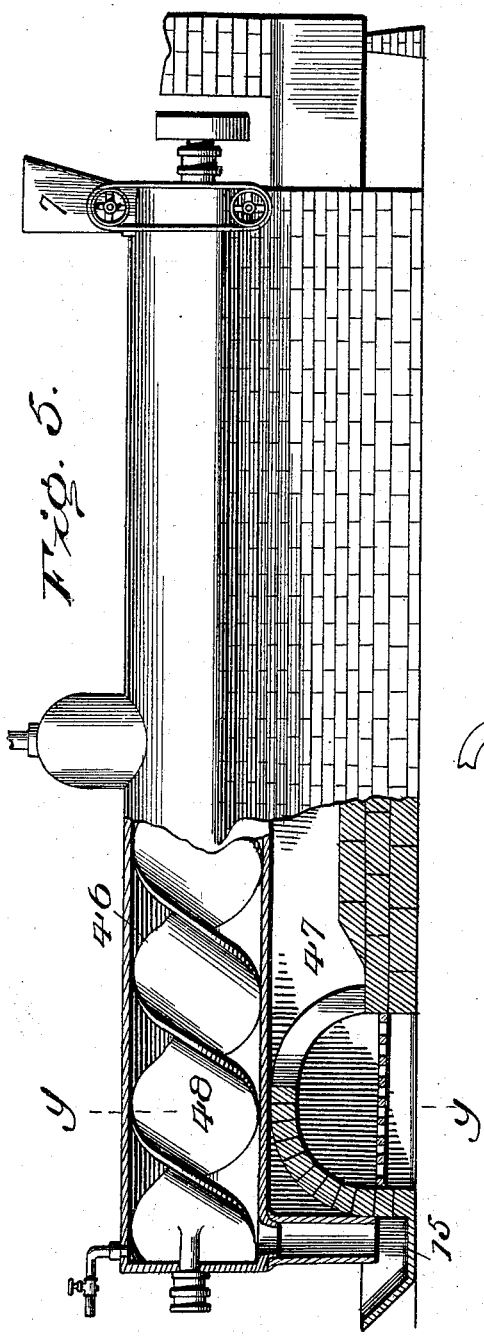
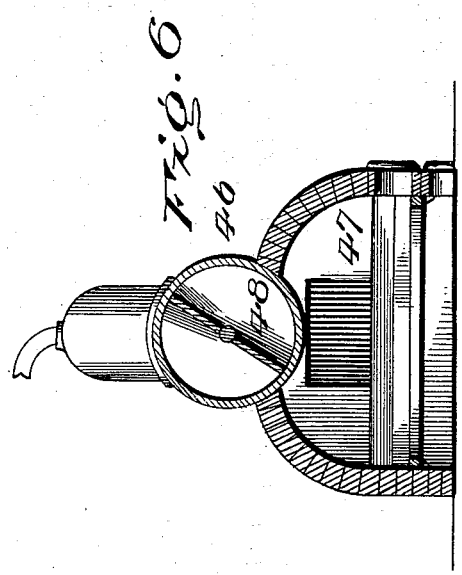
Witnesses
Inventor
Harry O. Chute
by R.H.A.B. Lacey, his Attorney

UNITED STATES PATENT OFFICE.

HARRY O. CHUTE, OF DESERONTO, CANADA.

PROCESS OF MAKING ACETONE.

SPECIFICATION forming part of Letters Patent No. 648,389, dated May 1, 1900.

Application filed June 10, 1899. Serial No. 720,087. (No specimens.)

*To all whom it may concern:*

Be it known that I, HARRY O. CHUTE, a citizen of the United States, residing in Deseronto, Province of Ontario, Canada, have invented certain new and useful Improvements in Processes of Making Acetone; and I do hereby declare the following to be a full, clear, and exact description of the invention, such as will enable others skilled in the art to which it appertains to make and use the same.

All methods of making acetone from metallic acetates are based upon the fact that destructive distillation resolves the acetic radical into equal molecules of carbon dioxide and acetone. An inconvenient bye-reaction, which is caused by the tendency of some metallic acetates to give up a portion of their acetic acid by simple volatilization upon heating, is usually obviated by the expedient of making the salt basic to begin with by the addition of a small portion of a base, generally lime, (*Handbuch der Chem.*, Liebig, Woehler & Poggendorff, 1842, Vol. 2, page 1019.) Acetates so treated, when carefully distilled on a laboratory scale, give a near approximation to the theoretical yield of acetone.

The fact that destructive distillation of metallic acetates yielded acetone was known in the last century, the reaction being carefully studied by Chenevix between 1803 and 1809, (*Gilbert's Annalen*, 1809, Vol. 32, page 156.) The method he used was essentially the same as that now in use—viz., placing a portion of the salt in a retort provided with a condenser and slowly and carefully heating by means of external heat until the reaction was complete. On the large scale this process as at present conducted is unsatisfactory. It is discontinuous, requires much time, and any inattention or carelessness results in large losses of acetone. As is said by an authority on the subject, "Careful regulation of the heating within narrow limits of variation is far the most important element in the process. Within very narrow limits, too little heat gives undecomposed acid, while too much gives inflammable gases instead of acetone." Slow and careful heating is enjoined by all familiar with the art, as the cardinal point in the process. Quick heating has always been regarded as fatal to success. This idea, which was first stated by Chenevix, I have discovered to be an error. There is no reason whatever for prolonged heating of a particle of acetate. The reaction takes place only at a definite temperature, which, while differing with the different acetates, is constant for each and will take place when that point is reached, whether heating be rapid or slow. For barium acetate this critical temperature is between 400° and 405° centigrade. For acetate of lime the temperature is about 300° centigrade. This temperature varies under certain conditions, among which may be mentioned the vapor tension of the inclosure in which the acetone is evolved. Hence the critical temperature can be approximately stated only and under like conditions remains fixed or constant.

The error has arisen from a misapprehension of the conditions of the process in common use. It is not because long continued heating is necessary to cause the acetone making reaction to occur, but because if heat be too sharply applied to a mass of acetate lying in a retort local overheating occurs and acetone is lost in consequence. Acetone is decomposed when heated to a temperature not far above that at which it is formed, breaking up into tar, gas, and carbon. It also has a tendency to polymerize at elevated temperatures, forming oily bodies of little value. The presence of the free alkali usually initially added to the acetate and of the alkali carbonate formed by the reaction itself tends to accelerate these detrimental bye-reactions.

Crystalline salts are bad conductors of heat, and when in the form of powders, as the acetate is in practice, their conductivity is even less. With a large bulk of such material (six hundred pounds is a common charge) lying in an externally-heated retort it is a matter of extreme difficulty to cause the mass to attain the exact heat desirable to secure a maximum yield. If a low heat approximating the reaction temperature be employed, heating of the entire mass takes place with intolerable slowness and the reaction is usually incomplete, while if brisker firing be used loss of acetone is likely to result. Portions of the salt lying next the wall become overheated and injure the acetone already formed, while yielding little or none themselves. The use of a stirrer merely palliates the evil, since no large mass of the physical consistency of decomposing crude acetate can be stirred, so as to cause each and every particle to acquire the desired temperature, neither more or less, with reasonable certainty.

My invention consists in substituting for this unscientific, wasteful, and tedious process of distillation in bulk a process of continuous destructive distillation in transit, treating the acetate in thin films, layers, small consecutive quantities, or in a finely-divided state either by passing it through a zone or over a surface heated to the exact temperature required for conversion, simultaneously removing the acetone produced from contact with the hot alkaline mass. This, I believe, represents the most important step forward in the art of making acetone since Chenevix.

My process not being dependent upon any particular structure or apparatus, a large variety of structures may be used to carry it out, such as ordinary shaft and shelf furnaces and driers, in transit bone-black kilns and driers. The only point is that the acetate be caused to travel forward through a zone or over a surface of constant temperature in a relatively-thin layer or finely-divided state, such heated surface of constant temperature being inclosed to prevent escape of the acetone and such inclosure being provided with means for withdrawing the acetone as fast as formed. By this process sharp decomposition of the acetate is obtained and the acetone evolved is at once removed to a relatively-cooler place.

For the sake of convenience I shall hereinafter speak more particularly of calcium acetate, that being the salt generally used, and it being understood that I regard it as typical, so far as my invention goes, of the acetates of potash, soda, baryta, magnesia, zinc, lead, &c.

In detail I prefer to proceed as follows: The acetate is made slightly alkaline in the known manner to prevent loss of acetic acid. Lime is the most convenient base to use; but potash and soda and their carbonates may be used in lieu thereof. Baryta and strontia are also suitable. Excess of alkali in my process does not have the detrimental effect that it has in the old process, since the acetone does not remain in contact with the hot mass, as it must do in the bulk process, nor does the mass become overheated. The powdered acetate is fed from a suitable hopper into a chamber and upon or in close contact with a heated surface kept at substantially the correct temperature, and over or past this surface it is caused to pass in a thin layer or in a finely-divided state by gravity or suitable mechanical means. It at once breaks up quantitatively into acetone and carbonate of lime. It is usually of advantage to run the feeding end of the heated zone or surface at a temperature slightly lower than the decomposing temperature of the acetate to give an opportunity to drive off accidental moisture, &c., leaving conversion to take place at the point intermediate of the extreme temperatures. By this is meant that the receiving and the delivery end portions of the converting zone or surface vary from the critical temperature, which is due, primarily, to locating the furnace or heater at one end thereof, and which end is hottest, the intermediate portion being maintained at the critical temperature and the opposite or receiving end portion being of a temperature lower than the critical point. The acetone expelled from this layer of material rises into the surrounding relatively-cooler chamber. From this chamber it is removed and conveyed to a condenser as fast as formed.

It is a well-known principle in chemical physics that the liberation of a volatile body, either by simple evaporation or by its direct formation, is accelerated by maintaining its vapor tension at the point of formation as low as possible. This, as is well understood, may be done either by maintaining a vacuum at the place of formation or by constantly sweeping past a body of indifferent gas or vapor. A familiar instance of this is the formation of quicklime. Limestone may be fused without decomposition if a moderate pressure of carbonic acid be maintained around it, while if a vacuum is maintained or if steam or air is sent over it in sufficient quantity to sweep off the carbonic acid as fast as formed decomposition takes place at comparatively-low temperature. The more efficient the removal of the carbonic acid the more easily the reaction proceeds. The same principle of course applies to making acetone, and therefore I run my circulating-pump constantly and keep the chamber as free of acetone as may be. A vacuum may be maintained or a current of steam kept passing through. If steam is used, it has the same advantage as other vapors or gases; but it has the disadvantage of diluting the condensed acetone. Air cannot be used, since it would burn the acetate and acetone; but any oxygen-free gas may be. The point is simply to remove the acetone as fast as possible by means of a current of indifferent gas or vapor. I have found that by maintaining a closed system and returning to the retort the incondensable gases passing the condenser in amount sufficient to maintain the desired tension is an efficient and economical way of proceeding.

I have devised different kinds of apparatus for carrying out the foregoing process, of which the annexed drawings illustrate preferred forms.

Figure 4:
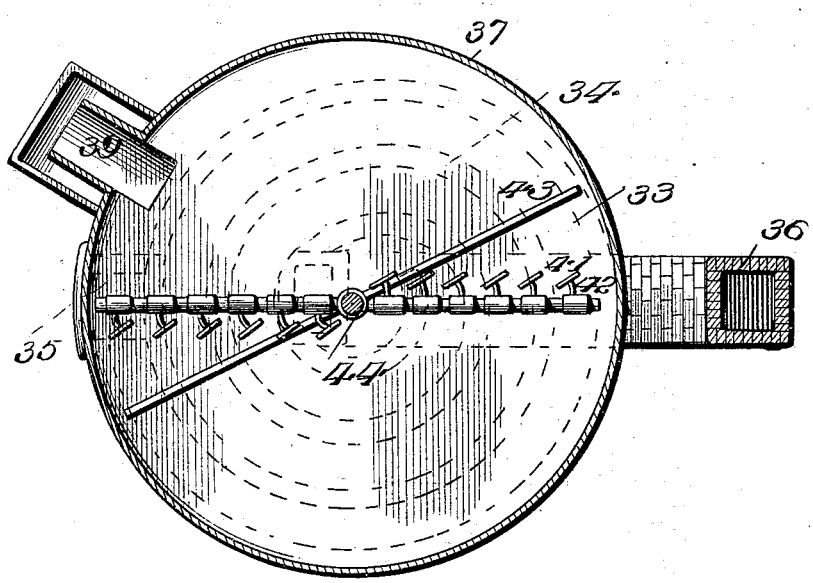

Figure 1 is a detail view in elevation of an apparatus for attaining the objects of this invention, parts being broken away to show more clearly the relative arrangement of the coöperating elements. Fig. 2 is a transverse section of the chamber about on the line X X of Fig. 1. Fig. 3 is a longitudinal section of an apparatus of different form. Fig. 4 is a top plan view thereof. Fig. 5 is a view in elevation of still another form of apparatus for effecting the objects in view, parts being broken away. Fig. 6 is a transverse section thereof about on the line Y Y of Fig. 5.

Corresponding and like parts are referred to in the following description and indicated in all the views of the drawings by the same reference characters.

In the form shown in Fig. 1 the chamber in which the destructive distillation of the acetate is carried on is arranged at an inclination, so as to take advantage of the force of gravity as an active agent in feeding the substance over the heated surface and through the heated zone in which the evolution of the acetone takes place. This chamber 1 is closed, so as to prevent the escape of the vapors when evolved or generated. The lower wall 2 of the chamber is flat and straight, whereas the top and sides unitedly are of arch form. The acetate is supplied to the chamber at its upper end, being fed thereto in relatively small or minute quantities in consecutive order, whereby the salt spreads in a relatively-thin film or layer or becomes finely divided, so as to insure a rapid heating thereof and a quick evolution of the acetone. In order to insure a positive feed of the salt over the lower wall 2 of the chamber, thereby preventing caking or sticking of the substance, it has been found expedient to combine with the chamber a force feeder or conveyer, the same consisting of an endless belt 3, provided at intervals in its length with blades or wings 4, which sweep over the surface of the lower wall 2 and carry the substance throughout the extent of the chamber and maintain the heating-surface in prime condition. This endless conveyer is supported at its ends upon rotary supports 5 and 6, which may be sprocket drums or pulleys, one of the supports constituting the driver and having the propelling force applied thereto.

The hopper 7, located at the receiving end of the chamber, has connection therewith by a neck portion 8, which is provided with a swelled or approximately-circular portion 9, in which is rotatably mounted a feeder 10, the latter consisting of a drum provided in its surface with a series of pockets, channels, or cavities, in which the acetate is received as the said pockets successively register with the receiving end of the neck 8, said acetate being discharged as the pockets aline with the lower end of the neck in the rotation of the feeder. It will thus be seen that the acetate is fed in relatively small or minute quantities in consecutive order so long as the apparatus is in running condition. The feeder is actuated in any desired manner and, as shown, is driven by means of a belt 11, connecting the pulley on its shaft with a corresponding pulley on the shaft of the upper rotary support 9, to which the power is applied for operating the endless conveyer.

The discharge at the lower end of the chamber is controlled by a valve or cut-off 12, which is opened at stated intervals to admit of the accumulated waste carbonate escaping. A receptacle 13 is in communication with the discharge-outlet and is separated therefrom by the cut-off or valve 12. A second cut-off or valve 14 is provided at the lower end of the receptacle 13 and is closed when the cut-off or gate 12 is open, thereby preventing the escape of gases and vapors should the same find an uninterrupted passage. A box 15 is located opposite the discharge-pipe 16, and its outer or front wall is upwardly and outwardly divergent, forming a chute to facilitate the shoveling away of the waste product resulting from the process of distillation. When the gate or cut-off 14 is closed, the cut-off 12 is open and the residuum passes from the chamber 1 into the receptacle 13, and when the latter is filled the cut-off 12 is closed and the gate 14 opened, thereby permitting the waste to escape into the box 15, from which it is removed to a convenient point of deposit.

The lower wall 2 of the chamber 1 constitutes the heating-surface over which the acetate is passed and in practice will be heated to the required temperature in the most convenient manner, and, as shown, a furnace 17 is located at the lower end of the chamber, and its upper portion comes beneath the wall 2 and inclines therewith, said wall 2 being common to the chamber 1 and combustion-chamber of the furnace 17. The side walls of the combustion-chamber 18 curve inwardly at their upper ends, as shown most clearly in Fig. 2, and join with the side walls of the chamber 1 about in the plane of the wall 2, thereby leaving the upper portion of the chamber 1 exposed to the cooling influence of the surrounding atmosphere, which is of advantage in preventing overheating of the actono when evolved in the process of distillation. The chamber 1 has its walls of plate metal, whereas the walls of the furnace and combustion-chamber are of masonry, with the exception of the wall 2, which is common to the chambers 1 and 18. A stack 19 has connection with the upper end of the combustion-chamber 18 and carries off the products of combustion. As a result of having the furnace located at one end of the chamber 1 and the exit 19 at the opposite end the wall 2 is subjected to a variable temperature, the portion adjacent to the furnace being hottest and the portion adjacent to the stack the coolest and the intermediate portion of a mean temperature, which in practice corresponds to the exact temperature at which the acetone is evolved from the acetate.

The acetone when liberated is in the form of a vapor or gas and is converted into available form by means of a condenser, the latter forming an essential part of the apparatus and being connected with the upper portion or wall of the chamber 1 by means of a pipe 20 and dome 21. The condenser 22 may be of any form or variety so long as it will subserve the purpose of reducing the vapor into liquid form. The discharge 23 of the condenser has a trap 24 connected therewith, said trap discharging into a receptacle 25, arranged to receive the acetone in liquid form. In the process of distillation foreign gases and vapors will be generated, and these in a great measure are separated from the acetone by means of the condenser and are returned to the chamber to be used again as a medium for carrying off the acetone immediately upon its liberation from the acetate. These gases are saturated with acetone at the temperature at which they leave the condenser. By returning these to the retort and again running them through the condenser this loss of acetone is prevented. A fan or steam-jet blower 26 is the means employed for positively circulating this gas or medium through the chamber 1 and condenser and is connected with the discharge 23 by means of a pipe 27, a corresponding pipe 28 connecting said fan-blower with the upper portion of the lower terminal of the chamber 1. A valve 29 is located in the length of the pipe 28 to shut off the current or blast when desired. Inasmuch as foreign gases are continuously generated in the operation of the apparatus means must be provided for the escape of the surplus amount and yet collect any free acetone not reduced by the condenser. The escape for the excess of vapor and gases consists of a liquid-sealed outlet which, as shown, comprises a nozzle 30 and a cup 31, the latter containing a liquid into which the discharge end of the nozzle dips. By varying the level of the liquid in the cup 31, so as to cause the nozzle to dip therein to a greater or less extent, the pressure of the circulating medium can be varied. It is presumed that the quantity of liquid in the cup will remain constant, and in order to change the effective level of the liquid said cup is moved vertically with reference to the nozzle and any desired means may be resorted to for supporting the cup at the required elevation, and, as shown, a jack 32 of ordinary construction is provided as a simple and effective means for attaining the desired end, although it is to be understood that the jack may be replaced by a variable support of any nature. The acetate or basic salt is placed in bulk in the hopper 7, and the endless conveyer and feeder being set in operation the acetate is fed into the chamber 1 in relatively small or minute quantities in consecutive order and becomes spread upon the wall or heating-surface 2 and advances by gravitation or by the combined action of gravity and the endless conveyer 3. As the acetate reaches the middle portion of the heated surface 2 conversion takes place and the acetone is evolved in the form of vapor, which is immediately carried off by the circulating medium or current of oxygen-free gas passing through the chamber 1, incident to the operation of the fan-blower. The acetone in the form of vapor passes to the condenser and is reduced to available or liquid form and escapes into the receptacle 25. The process is practically continuous and uninterrupted, since the acetate is fed without interruption as long as the apparatus is in running condition. The waste carbonate continuously discharges at the lower end of the chamber. It will thus be seen that there is a continuous feed of the salt, a continuous discharge of the waste carbonate, and a continuous outflow of the acetone, the several operations being effected at one and the same time and practically in successive order.

In the form of apparatus shown in Figs. 3 and 4 the feeder, condenser, fan-blower, trap-outlet for the liquid acetone, and the regulator for the escape of the surplus circulating medium are omitted, since they are substantially the same as shown and described in connection with the form illustrated in Fig. 1. This is also true of the form of apparatus shown in Figs. 5 and 6. The chief difference exists in the construction of the chamber, the furnace, and the means for effecting a positive feed of the acetate over the heated surface and causing a spread of the same, so as to insure every particle being brought into contact with the heated surface, so as to effect a liberation of the acetone.

In the form shown in Figs. 3 and 4 the heating-surface 33 is a metallic plate of circular outline surmounting a combustion-chamber 34 of spiral formation and connected at its outer end with a furnace 35 and at its inner end with a stack 36. The shell or casing 37 inclosing the chamber in which the destructive distillation is carried on is approximately of dome shape and is preferably of metal. The acetate is fed upon the center portion of the heating-surface 33 by means of a spout 38, connected with the hopper 7, with which coöperates the feeder 10 in the manner herein set forth. The central portion of the heating-surface 33 being connected with the stack or outlet 36 is cooler than the outer portion, which is in direct contact with the flame and gases from the furnace 35. The intermediate portion of the heating-surface 33 is of mean temperature corresponding to that required for the evolution of the acetone. Positive means are essential to effect a distribution of the acetate over the heating-surface and cause it to move from the center outward to the discharge 39. As shown, the feeder consists of a diametrically-disposed sweep 40, provided at intervals in its length with blades 41, connected by spring-arms 42 with the sweep, said blades being disposed obliquely to the radii of the axial line of rotation of the feeder. A leveler 43, consisting of a bar, is disposed to operate immediately in the rear of the blades 41, so as to spread the acetate over the heating-surface 33 after the action of the blades 41 in effecting the outward movement thereof. The acetate is deposited upon the central portion of the heating-surface and is immediately acted upon by the innermost blades and moved outward, the leveler serving to spread the acetate in its new position. The blade following the one previously acting upon the substance comes in contact therewith and moves the same outward a distance corresponding to its width, and all the blades in succession act upon the acetate and move it from the center to the point of discharge 39, as will be readily understood. The outward movement of the acetate is progressive, depending upon the extent of the blades 41 and the rapidity of the feeder. The leveler and sweep are attached to the lower end of a vertically-disposed shaft 44, which is driven by any suitable source of power by means of the intermeshing of miter-gears 45.

In the form shown in Figs. 5 and 6 the chamber 46 is of circular outline in transverse section and is disposed horizontally and is located over the furnace and combustion-chamber 47 of substantially the same form as that shown in Fig. 1, the furnace being at one end and the stack at the opposite end. The conveyer 48 is of the screw type and feeds the acetate through the chamber continuously and at the same time serves to distribute and agitate it, so as to bring every particle into contact with the heating-surface. As in the previously-described forms, the chamber 46 has its lower portion only in contact with the heating medium, the upper portion being exposed to the cooling influence of the air, whereby overheating of the acetone is avoided. The discharge-pipe 16 extends into the box 15, the cut-offs being dispensed with, since care is to be observed in removing the waste, so as not to entirely uncover the delivery end of the discharge 16, whereby advantage is taken of forming a seal to prevent the escape of the acetone by means of the waste residuum.

It is to be expressly understood that the apparatus is subsidiary to the vital feature of the invention, which resides in the process of treating metallic acetates to effect a separation of the acetone by destructive distillation, said process having for its fundamental principle the evolving of acetone from an acetate by subjecting the latter in a finely-divided state or relatively-minute quantities in successive order to a heating medium of the exact or required temperature to liberate the acetone without resolving it into undesirable substances or products such as result from overheating and at the same time carrying off the acetone and preventing its injurious contact with the hot mass of resultant waste carbonate.

I have also discovered that my process of destructive distillation in transit is equally applicable to the making of other ketones than acetone, (dimethyl ketone.) The salts of the fatty acids above acetic acid (propionic, butyric, pentoic, caproic, œnanthylic, caprylic, pelargonic, capric, hendecatoic, lauric, tridecatoic, myristic, pentadecatoic, palmitic, margaric, stearic, &c.) upon distillation yield ketones. Mixtures of the salts, as is well known, yield mixed ketones, a mixture of lime propionate and lime acetate, for instance, giving methylethyl ketone. The ketones above acetone in the series, whether simple or mixed, are substances of higher boiling-point, this increasing as the scale is ascended. They are also more sensitive to heat, breaking up with more rapidity. For this reason my improved process of distillation in transit yields more important advantages, even with these more complex bodies, than it does with acetone itself. With the higher bodies the features of diminishing the vapor tension is particularly important, and in most cases the use of vacuum should be resorted to. Using vacuum and transit distillation from stearic-acid salts a much larger proportion of stearone can be obtained than is possible in distilling in a retort, in which case the bulk of the products is decomposition products. Various acids of the aromatic series, such as benzoic acid, when converted into salts and distilled with fatty-acid salts yield mixed aromatic aliphatic ketones. From the foregoing it will be readily understood that the manufacture of such higher simple and mixed ketones from metallic salts of organic acids by destructive distillation in transit is regarded as within the purview of the invention as set forth in the appended claims.

Having thus described the invention, what is claimed as new is—

1. The manufacture of ketones from metallic salts of organic acids, which consists in subjecting a progressively-moving thin film or layer of such salt to the action of heat sufficient for the formation of a ketone, substantially as described.

2. The herein-described process of obtaining acetone from acetates which consists in passing the pulverulent material in the form of a thin film or layer over a heated surface maintained at substantially the temperature set forth.

3. The herein-described process of obtaining acetone from acetates which consists in passing the pulverulent material in the form of a thin film or layer over a heated surface maintained at substantially the temperature set forth and removing the solid residuum as fast as formed.

4. The herein-described process of obtaining acetone from acetates which consists in passing the pulverulent material in the form of a thin film or layer over a heated surface maintained at substantially the temperature set forth and removing the acetone as fast as formed by a current of indifferent gas or vapor.

5. The herein-described process of forming acetone, consisting of passing the acetate in a relatively-thin layer or finely-divided state over a surface heated to the proper degree of temperature to insure rapid conversion and an evolution of the acetone and simultaneously and continuously reducing the tension of the acetone vapor to the smallest amount possible, substantially as described.

6. The herein-described process of producing acetone, consisting of bringing the acetate in a finely-divided state into contact with a surface heated to the proper temperature for effecting conversion, and simultaneously removing the acetone from the hot alkaline mass by a current of oxygen-free gas passing immediately over said surface in direct contact with the mass at the point of evolution, substantially as described.

7. The herein-described process of producing acetone, consisting of continuously passing the acetate in a relatively-thin layer or finely-divided state over a surface heated sufficiently to liberate the acetone, and passing a current of oxygen-free gas over the hot alkaline mass and advancing acetate in an inverse direction to the movement of the acetate, substantially as described.

8. In the production of acetone by the destructive distillation of a metallic acetate, passing the latter through a zone having a mean temperature corresponding to that necessary to evolve the acetone, instantly separating the acetone from the heated alkali and sweeping it past the acetate inversely to its advance movement, substantially as set forth.

9. In the process of producing acetone by the destructive distillation of an acetate, supplying the acetate in minute or relatively-small quantities in successive order to a properly-heated surface, separating the acetone from the evolved gases, and again utilizing the latter in the continuous operation of the process, substantially as set forth.

10. In the process of producing acetone by the destructive distillation of an acetate, supplying the acetate in minute or relatively-small quantities in successive order to a properly-heated surface, passing a gaseous current over the salt to carry off the acetone when liberated, separating the acetone from the gaseous carrier, reheating the latter and again passing it over the acetate for use in the manner substantially as set forth.

11. In the process of producing acetone by the destructive distillation of an acetate, supplying the acetate in minute or relatively-small quantities in successive order to a properly-heated surface, simultaneously agitating and moving the acetate over said heated surface, passing a gaseous current over the heated mass, subsequently separating the acetone from the neutral or indifferent gases, and again utilizing the gas as a carrier medium, substantially as described.

12. In the process of obtaining acetone from an acetate which consists in subjecting the salt in a progressively-moving film or relatively-small portions to the action of heat sufficient to evolve the acetone, passing a current of indifferent gas over the salt to carry off the acetone, separating the acetone from the indifferent gas, reheating the latter and again passing it over the acetate.

13. In the process of evolving acetone from an acetate at the critical temperature, reducing the vapor tension simultaneously with and at the point of conversion of the salt, substantially as set forth.

14. In the process of evolving acetone from acetate subjecting the salt in transit in a film or relatively-small quantities in consecutive order to the action of heat maintained at the critical temperature, and simultaneously reducing the tension of the evolved vapor at the point of conversion and carrying off the vapor as quickly as formed, substantially as and for the purpose specified.

15. In the manufacture of ketones, the process which consists in subjecting metallic salts of aliphatic organic acids in a progressively-moving film or layer to the action of heat maintained at the critical temperature, substantially as described.

16. In the manufacture of acetone, the process which consists in subjecting metallic acetates in a progressively-moving film or layer to the action of heat maintained at the critical temperature, substantially as specified.

In testimony whereof I affix my signature in presence of two witnesses.

HARRY O. CHUTE. [L. S.]

Witnesses:
C. C. HINES,
GEO. E. FRECH.